3,732,325
Patented May 8, 1973

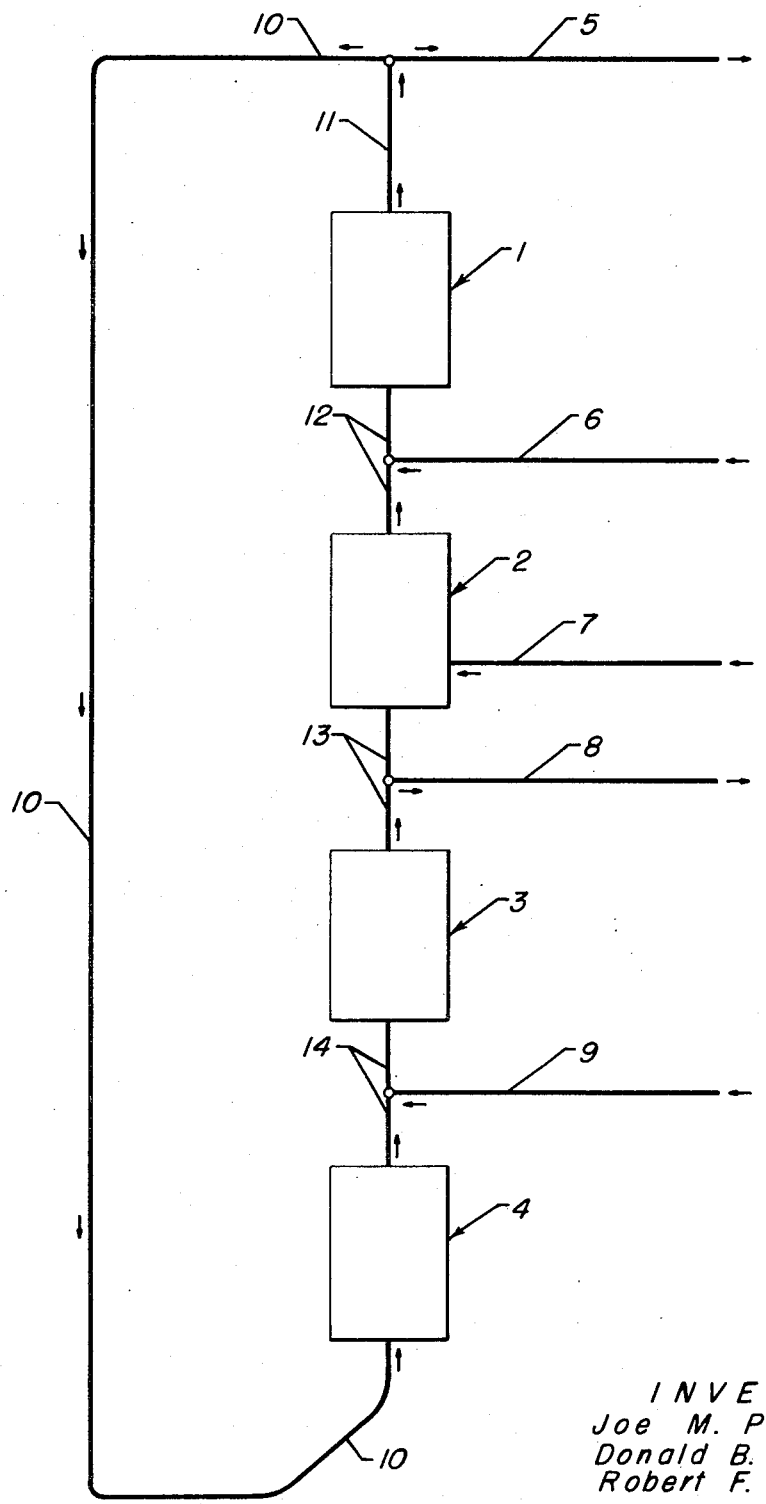

3,732,325
HYDROCARBON SEPARATION PROCESS
Joe M. Pharis, Lockport, Robert F. Zabransky, Hinsdale, and Donald B. Broughton, Evanston, Ill., assignors to Universal Oil Products Company, Des Plaines, Ill.
Filed Dec. 28, 1970, Ser. No. 101,676
Int. Cl. C07c 7/12
U.S. Cl. 260—674 SA                     8 Claims

ABSTRACT OF THE DISCLOSURE

A process for the separation of aromatic hydrocarbons which process comprises the adsorption of selected feed components followed by desorption of selected feed components from a solid adsorbent through the use of a desorbent material. The process allows the adsorbent which has just contacted feed stock and which selectively adsorbs a selected component therefrom to be contacted with a quantity of selectively adsorbed feed component to remove undesired raffinate components which are either adsorbed by the adsorbent or present within the interstitial void spaces between the adsorbent particles prior to recovery of the extract material in a desorption step. The selectively adsorbed feed component can be taken from either a product extract stream or directly from the portion of the adsorbent in which the desorption step takes place.

BACKGROUND OF THE INVENTION

Field of the invention

The field of art to which the invention pertains is hydrocarbon separation. More specifically this invention relates to a simulated moving bed separation process in which a fixed mass of adsorbent and a varying concentration of components of a fluid stream contact each other in a counter-current flow fashion.

Description of the prior art

The prior art contains many issued patents relating to countercurrent separation operations in which a fixed bed of adsorbent is utilized and in which a fluid material is shifted throughout a mass of adsorbent to effectively produce a simulated moving bed system in which there is flow of adsorbent with respect to fluid circulating in the process. Specifically, contained in the prior art and considered to be generally related to the present invention are U.S. Patent 2,985,589 having as its inventors, D. B. Broughton and C. G. Gerhold (Cl. 210–34), U.S. Patent 3,274,099 having as its inventor D. B. Broughton (Cl. 208–310) and U.S. Patent 2,646,451 having as its inventor R. H. Rommel (Cl. 260–674). All of the aforementioned patents relate to countercurrent solid-fluid separation processes. The first patent discloses the basic concept of a simulated countercurrent solid-fluid contacting process employing a fixed bed of solid adsorbent having moving input and output streams which allow a segregation of zones in which separate functions are taking place in order to separate a feed component into a raffinate product component and an extract product component. The second mentioned patent includes the same basic processing steps and includes an additional input stream in a rectification zone, which is located between an adsorption zone and a desorption zone, in which a sweeping agent is passed into the process to push raffinate material which is trapped between the interstitial void spaces between adsorbent particles back into an adsorption zone to prevent raffinate material from passing from the adsorption zone into a desorption zone thereby contaminanting an extract product with raffinate material. The sweeping agent used in the second patent is considered to be a material which is easily separable from the feed stock by distillation means. The process disclosed in the third patent includes a basic adsorption-desorption operation involving a moving bed of silica gel to effect a countercurrent solid and fluid contacting process. The process utilizes the recycling of a raffinate material to a second desorption zone to remove adsorbed desorbent from the solid adsorbent which is passing to an adsorption zone. The purpose of recycling the raffinate is to totally remove desorbent material from the adsorbent before it has the opportunity to contact feed components passing into the adsorption zone via a charge stream. In this reference the recycled raffinate material is passed into an adsorption zone at a location between a feed stock introduction and a raffinate withdrawal. Our invention allows an adsorption zone to be operated by passing feed stock as the only introduction material into the adsorption zone while removing a raffinate stream from that zone. There is no recycling of raffinate material to the adsorption zone of the invention herein presented.

The process of this invention relates to fixed solid simulated moving bed countercurrent processing scheme in which zones are shifted through the mass of adsorbent to allow various portions of the mass of adsorbent to function as adsorption and desorption zones. A purification stream containing extract material is passed into the zone which is located between the adsorption and the desorption zones (1) to displace from the interstitial void spaces between the adsorbent particles any raffinate materials carried into this zone, (2) to remove feed contaminants adsorbed by the adsorbent, and (3) to substantially reduce the quantity of desorbent which normally surrounds the adsorbent particles in this zone when there is no purification stream used. Since in normal operations the quantity of the material which is removed from the desorption zone is passed into the zone located between the desorption zone and the adsorption zone as part of the normal flow sequence, desorbent material can contact the adsorbent in that zone. The adsorbent present in the zone located immediately between the adsorption zone and the desorption zone contains its highest quantity of adsorbed extract material and is in contact with the smallest quantity of extract material in the fluid surrounding the adsorbent. The presence of desorbent in relatively large quantities in this zone reduces the ability of the adsorbent to selectively remove this small quantity of extract material from the fluid surrounding the adsorbent. In order to overcome this problem we have found that a purification stream containing a relatively high percentage of extract material is passed into the zone located between the adsorption zone and desorption zone to take place of the desorbent which during normal countercurrent operations would flow along with a quantity of extract material into this zone according to the prior art teachings.

The extract material which passed into the intermediate zone can be taken either from the first material removed from the desorption zone via an extract stream outlet since this material generally contains an almost totally pure extract material, or from extract material which has been separated from desorbent material in an extract stream fractionator.

SUMMARY OF THE INVENTION

It is an object of the present invention to allow a portion of a relatively pure extract stream to be passed into a zone located between an adsorption and a desorption zone to allow raffinate present in that zone adsorbed by the adsorbent and within its non-selective void volume to be displaced from the intermediate zone by the extract material passing into the intermediate zone. It is another object of the present invention to allow extract material to be passed into the intermediate zone to reduce the quantity of desorbent which normally passes into this zone and which has been found to reduce the ability of the adsorbent to selectively adsorb extract material from the fluid surrounding the adsorbent particles in the intermediate zone.

In order to gain a more full understanding of the process of this invention the following definitions are given. The term "feed stream" indicates a stream in the process through which feed material passes into the adsorption zone. The term "desorbent stream" indicates the stream through which desorbent material passes into the desorption zone. The term "extract stream" refers to a stream through which the extract material desorbed in the desorption zone is removed from the process. The extract stream can contain from essentially a pure 100% extract material to material which may contain substantial quantities of desorbent material. The term "raffinate stream" signifies a stream through which non-selective components of the feed are removed from the process.

The material passing through the raffinate stream may vary from essentially 100% desorbent material to instances in which raffinate material is present in substantial portions. The term "raffinate material" shall mean a less selectively adsorbed feed component. In instances in which para-xylene is selectively adsorbed by an adsorbent from a feed stream containing three xylene isomers and ethylbenzene the raffinate material includes the less selectively adsorbed components of the feed stock— namely, ortho-xylene, meta-xylene and ethylbenzene. The term "extract material" as used in this specification shall refer to the material or materials from the feed stock which are selectively adsorbed by the adsorbent and which are removed from the adsorbent during the desorption operations in the desorption zone as a product material. Typically, the aforementioned feed mixture of xylene would include para-xylene as the extract material. The extract material, however, may include more than one species of a group and in some instances may include two isomers from the xylene group depending one the adsorbent's selectivity towards feed components. The term "purification stream" as used in the specification shall include a stream containing extract material typically 100% extract material although in some instances small portions of desorbent material may be present in the purification stream passed into the process.

The source from which the purification stream is derived can be either a fractionating column into which an extract stream had been passed to essentially separate desorbent material from extract material, or the desorption zone in instances in which the first material withdrawn from the desorption zone contains a high concentration of extract material.

The term "selective pore volume" of the adsorbent is defined as the volume of the adsorbent which selectively adsorbs extract components from the feed stock. The term "non-selective void volume" of the adsorbent is the volume of the adsorbent which does not selectively retain extract components from the feed stock. This volume includes the cavities of the adsorbent which contain no adsorptive sites and the interstitial void spaces between adsorbent particles. The selective pore volume and the non-selective void volume are generally expressed in absolute volumetric quantities and are of importance in determining the proper flow rates of fluid required to be passed into an operational zone for efficient operations to take place for a given quantity of adsorbent.

When adsorbent passes into an operational zone its non-selective void volume together with its selective pore volume carries fluid into that zone. The non-selective void volume is utilized in determining the amount of fluid which should pass into the same zone in a countercurrent direction to the adsorbent to displace the fluid present in the non-selective void volume. If the fluid flow rate passing into a zone is smaller than the non-selective void volume rate of adsorbent material passing into that zone, there is a net entrainment of liquid into the zone by the adsorbent. Since this net entrainment is a fluid present in non-selective void volume of the adsorbent, it in most instances comprises less selectively retained feed components.

The selective pore volume of an adsorbent can in certain instances adsorb portions of raffinate material from the fluid surrounding the adsorbent since in certain instances there is competition between extract material and raffinate material for adsorptive sites within the selective pore volume. If a large quantity of raffinate material with respect to extract material surrounds the adsorbent, raffinate material can be competitive enough to be adsorbed by the adsorbent.

In describing the process of this invention it is generally necessary that three separate operational zones be present in order for the process to take place although in some instances an optional fourth zone may be used. The adsorption zone, which shall hereinafter be referred to as zone 1, is a zone in which a feed component is passed in order that the adsorbent present in this zone be allowed to selectively adsorb an extract material from the feed stock. When the feed stock is passed into zone 1 a raffinate stream is withdrawn from zone 1. The raffinate stream withdrawn from zone 1 varies in composition from essentially pure desorbent material which was present either in the adsorbent's selective pore volume or in the non-selective void volume from a previous desorption step to essentially 100% raffinate material. For the purposes of this specification the adsorption or zone 1 shall be defined as the mass of adsorbent located between the feed stream inlet and the raffinate stream outlet. Since the general flow through zone 1 is from the feed stream which passes into the zone to the raffinate stream which passes out of the zone, the flow in this zone is considered to be a downstream direction when proceeding from the feed to the raffinate streams.

Immediately upstream with respect to the fluid flow in zone 1 is operational zone 2 which in the process of this invention is considered to be a purification zone. The boundaries of zone 2 are defined by the extract stream outlet and the feed stream inlet. The essential operations taking place in this zone are the displacement from the non-selective void volume of the adsorbent of any raffinate material carried into zone 2 by the shifting of adsorbent into this zone and the desorption of any raffinate material adsorbed within the selective pore volume of the adsorbent if such material is present upon the adsorbent. Purification is effected by the use of the purification stream along with in some instances a portion of extract stream material which can comprise both extract material and desorbent materials and which can pass into zone 2 from its upstream boundary (the extract stream). The flow of material in zone 2 is in the direction of its downstream boundary which is the feed stream inlet.

Immediately upstream of operational zone 2 with respect to the fluid flowing in zone 2 is zone 3 or the desorption zone. The function of the desorption zone is to allow a desorbent material to pass into this zone to displace the extract material which has been adsorbed upon the adsorbent during a previous contact with feed in an adsorption zone in a prior cycle of operation. Zone 3 is defined at its upstream boundary by the desorbent inlet stream and at its downstream boundary by the extract outlet stream. The flow of fluid in zone 3 is essentially in the same direction as that of zones 1 and 2.

In some instances a fourth optional zone may be utilized. This zone, if used, is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone into the desorption zone. Zone 4 contains enough adsorbent so that raffinate material present in the raffinate stream passing out of zone 1 and into zone 4 can be prevented from passing into zone 3 thereby contaminating extract stream removed from zone 3. In the instances in which the fourth operational zone is not utilized the raffinate stream passed from zone 1 to zone 4 must be carefully monitored in order that the flow directly from zone 1 to zone 4 can be stopped when there is an appreciable quantity of raffinate material present in the raffinate stream passing from zone 1 into zone 4. This problem may be overcome when utilizing only three zones by supplementing the flow of raffinate stream material into zone 4 by fractionating the raffinate stream withdrawn from zone 1 to separate desorbent material from raffinate material and passing a portion or all of the fractionated desorbent to zone 4. This step can be costly and requires additional fractionation facilities and results in the inefficient use of desorbent material.

In adsorptive-separation processes an important factor that is used to determine the ability of a particular adsorbent to separate components of a feed is the selectivity of the adsorbent for one component as compared to another component. The selectivity (B) as used throughout this specification is defined as the ratio of two components of the adsorbed phase over the ratio of the same two components in the unadsorbed phase at equilibrium conditions and is expressed in equation form in Equation 1 below, $$\text{Selectivity} = B_{C/D} = \frac{(\text{Vol. \% } C/\text{vol. \% } D) \ A}{(\text{Vol. \% } C/\text{vol. \% } D) \ U} \quad (1)$$

where C and D are two components of the feed represented in volume percent and the subscripts A and U represent the adsorbed and unadsorbed phases respectively. The equilibrium conditions as defined here wree determined when the feed passing over a bed of adsorbent did not change composition after contacting the bed of adsorbent, or in other words, there was no net transfer of material occurring between the unadsorbed and adsorbed phases when the selectivity of the two selected components was measured.

As can be seen where the selectivity of two components approaches 1.0 there is no preferential adsorption of one component by the adsorbent. As the absolute value of B becomes greater than unity there is a preferential selectivity by the adsorbent of one component. When comparing the selectivity of component C over component D, a B larger than 1.0 indicates preferential adsorption of component C within the adsorbent while a B less than 1.0 would indicate that component D is preferentially adsorbed leaving an unadsorbed phase richer in component C and an adsorbed phase richer in component D.

In adsorptive-separation processes the separation of aromatics such as xylenes or diethylbenzene can be effected through the use of a crystalline aluminosilicate adsorbent. Common crystalline aluminosilicates which can effectively separate aromatics are the synthetically prepared type X and Y zeolites containing selected cations at the exchangeable cationic sites within the zeolite crystal structure or the naturally occurring faujasites.

Both the natural and synthetic aluminosilicates may be used as adsorbents in the present process. A crystalline zeolitic aluminosilicate encompassed by the present invention for use as an adsorbent includes aluminosilicate cage structures in which the alumina and silica tetrahedra are intimately connected with each other in an open three-dimensional crystilline network. The tetrahedra are cross-linked by the sharing of oxygen atoms. The spaces between the tetrahedra are occupied by water molecules prior to dehydration. Subsequent partial or total dehydration results in crystals interlaced with channels of molecular dimensions. Thus, the crystalline aluminosilicates are often referred to as molecular sieves. In the hydrated form, the crystalline aluminosilicates may be represented by the formula represented in Equation 2, $$M_{2/n}O:Al_2O_3:wSiO_2:yH_2O \quad (2)$$

where M is a cation which balances the electrovalence of the tetrahedra, $n$ represents the valence of the cation, $w$ represents the mols of $SiO_2$, and $y$, the mols of water. The cations may be any one of a number of cations such as for example the alkali metal cations or the alkaline earth cations or other selected cations.

Crystalline aluminosilicates which find use as adsorbents in the process of this invention possess relatively well-defined pore structures. The exact type aluminosilicate is generally referred to by the particular silica-alumina ratio and the pore dimensions of the cage structures. The faujasites are commonly represented as type X and type Y aluminosilicates and are defined by their varying silica to alumina ratios.

The zeolite type X can be represented in terms of the mol ratio of oxides as represented in the following Equation 3, $$0.9 \pm 2M_{2/n}O:Al_2O_3:2.5 \pm 0.5SiO_2:yH_2O \quad (3)$$

where M represents at least 1 cation having the valence of not more than 3, $n$ represents the valence of M, and $y$ is a value up to about 8 depending upon the identity of M and the degree of hydration of the crystal. Zeolite type X is described in U.S. Pat. No. 2,882,244.

The zeolite type Y may be represented in the terms of the mol ratio of oxides for the sodium form as represented in the following Equation 4, $$0.9 \pm 0.2Na_2O:Al_2O_3:wSiO_2yH_2O \quad (4)$$

The exchangeable cationic sites for the type X and Y zeolites, in general, can be defined as represented in Equation 2 above as "M." Cationic exchange or base exchange methods are generally known to those familiar with the field of crystalline aluminosilicate production and are generally performed by contacting a zeolite with an aqueous solution of soluble salts of the cations or cation desired to be exchanged on the sieve. The desired degree of cation exchange is allowed to take place before the sieves are removed from the aqueous solution and dried to a desired water content. It is contemplated that in cationic exchange or base exchange methods that the cation exchange may take place using individual solutions of desired cations to be placed on the molecular sieve or can use exchange solutions containing mixtures of the cations which are desired to be exchanged onto the crystalline aluminosilicate zeolite.

The type X and Y zeolite adsorbents containings at their exchangeable cationic sites cations from the group of potassium, rubidium, cesium, barium, copper, silver, lithium, sodium, beryllium, magnesium, calcium, strontium, cadmium, cobalt, nickel, manganese and zinc or combination thereof are preferred for use in the separation process herein disclosed when separating xylenes or diethylbenzenes. Improved results, however, can be attained by choosing at least one cation from the group of potassium, rubidium, cesium, barium and silver and at least one cation from the group of lithium, sodium, potassium, barium, magnesium, calcium, strontium, beryllium, cadmium, cobalt, nickel, copper, manganese, silver and zinc.

The desorbent used in the process of this invention should be a material that is easily separated from the feed mixture. In desorbing the preferentially adsorbed component of the feed both desorbent and the desorbed feed component are removed from the adsorbent bed in admixture, and without a method of separation in these two materials the purity of the selectively adsorbed component of the feed would not be very high. Therefore, it is contemplated that a desorbent that is of a different boiling range than the feed mixture fed to the solid adsorbent be used in this process. The use of a desorbent of a differing boiling range would allow fractionation or other separation methods to be used to separate the selectively adsorbed feed component as a relatively pure product stream and allow recovery of the desorbent for possible reuse in the process. Desorbents which can be used in the process of this invention include benzene, toluene, ethers, alcohols, chlorinated cyclics, cyclic dienes and the ketones. Xylenes can be used as desorbents for diethylbenzene feed stocks while diethylbenzene can be used as desorbents for xylene feed stocks.

Both liquid and vapor phase operations can be used in the process of this invention. The liquid phase operations are preferred because of the lower temperatures requirements and slightly improved selectivities associated with the lower temperatures employed in liquid phase operations. Temperature ranges which can be used in adsorption of the preferred xylene isomer within the adsorbent include the range of from about 40° C. to about 250° C. Pressures preferred in the operation of this invention are included in the range of from about atmospheric to about 500 p.s.i.g. Desorption conditions include the same range of temperatures and pressures as used for adsorption.

Feed streams which can be used in the process of this invention comprise at least two components selected from the diethylbenzenes or xylenes including ethylbenzene with the possible inclusion of portions of straight and branched-chain paraffins, cyclo paraffins and aromatics including benzene, toluene, naphthalenes, etc. It is preferred, however, to use feed streams having $C_8$ or $C_{10}$ aromatic concentrations of from about 80 to 100 volume percent of the total feed contacting the adsorbent bed.

In testing various adsorbents the selectivity ($B_{C/D}$) as defined previously was determined using apparatus and procedures as described below. The apparatus used to measure the selectivity of a particular adsorbent consisted of a chamber of approximately 40 cc. volume having inlet and outlet ports at opposite ends of the chamber. The chamber was contained within a temperature controlled heating means and in addition pressure control equipment was used to operate the chamber at a constant predetermined pressure. Attached to the outlet line connected to the outlet of the chamber there was chromatographic analysis equipment which was used to analyze the effluent stream leaving the adsorbent chamber.

The following general procedures were used to determine the B for various adsorbents tested in the chamber. A feed mixture having a known composition was passed through the adsorbent chamber at a regulated pressure and temperature until the effluent composition flowing from the adsorbent chamber remained at a constant composition indicating that there was no net transfer between the adsorbed phase within the adsorbent and the unadsorbed or external phase surrounding the sorbent particles. A second mixture containing a hydrocarbon which was able to desorb the previously adsorbed component of the feed from the adsorbent was then passed through the adsorbent chamber. The chromatographic analysis equipment was used to monitor the unadsorbed or external phase and the material desorbed from within the adsorbent. Knowing the compositions of these two streams the B for various components present in the feed stream could be determined.

The feed streams which were used to illustrate the process of this invention in the aforementioned testing apparatus consisted of equal quantities (8⅓ vol. percent each) of ethylbenzene, para-xylene and meta-xylene mixed with 2,2,4-trimethylpentane rendering a feed mixture containing 75 vol. percent paraffinic material and 25 vol. percent $C_8$ aromatic isomer material. The $C_8$ aromatic isomers were diluted in the paraffin material to facilitate ease of analyzing the adsorbed and unadsorbed phases for B determination. Orthoxylene was excluded, since its presence would have complicated the analytical procedures, although previous experiences indicated that the ortho-xylene isomer behaved substantially the same as the meta-xylene isomer. The desorbent material consisted of 25 vol. percent toluene, 74 vol. percent 2,2,4-trimethylpentane and 1 vol. percent neohexane which was used as a tracer to determine desorbent breakthrough in the effluent stream leaving the adsorbent chamber.

The adsorbents used were originally the sodium type X or type Y zeolites which contained cations as is indicated by their individual description. The adsorbents indicated as containing a single cation were essentially totally ion exchanged and generally contained less than about 2 wt. percent residual sodium based on volatile free adsorbent—that is less than 2 wt. percent residual sodium based on the adsorbent after being subjected to 900° C. calcination temperatures to drive off volatile material. The adsorbents which contained two different cations were also essentially totally ion exchanged and contained the two indicated cations.

EXAMPLE I

In this example, type Y zeolites are used. The zeolite was essentially totally ion exchanged with the indicated cation and was tested for para-xylene/ethylbenzene selectivity ($B_{p-x/EB}$) and for para-xylene/meta-xylene selectivity ($B_{p-x/M-x}$) as previously described. The results are indicated in Table I below.

TABLE I

| | Selectivity | |
|---|---|---|
| Sieve description | $B_{p-x/M-x}$ | $B_{p-x/EB}$ |
| Group IA metals: | | |
| Type Y: | | |
| Lithium exchanged | 0.72 | 1.52 |
| Sodium exchanged | 0.75 | 1.32 |
| Potassium exchanged | 1.83 | 1.16 |
| Rubidium exchanged | 1.51 | 0.96 |
| Cesium exchanged | 1.50 | 0.80 |
| Type X: Sodium exchanged | 1.02 | 1.15 |
| Group IIA metals: | | |
| Type Y: | | |
| Beryllium exchanged | 0.91 | 1.08 |
| Magnesium exchanged | 0.59 | 1.67 |
| Calcium exchanged | 0.35 | 1.17 |
| Strontium exchanged | 0.44 | 1.40 |
| Barium exchanged | 1.27 | 1.85 |
| Others: | | |
| Type Y: | | |
| Nickel exchanged | 0.70 | 1.27 |
| Copper exchanged | 0.62 | 1.46 |
| Silver exchanged | 1.02 | 1.19 |
| Manganese exchanged | 0.66 | 1.25 |
| Cadmium exchanged | 0.61 | 1.19 |

As can be seen from the data above, the only single cation exchanged adsorbents which could be used for para-xylene separation from streams containing meta-xylene and ethylbenzene are potassium, barium, sodium and silver exchanged zeolite adsorbents.

EXAMPLE II

In this example the zeolite was essentially totally ion exchanged with an aqueous mixture containing the two cations desired to be placed on the zeolite adsorbent. The adsorbents which contained both Group I-A and Group II-A cations were ion exchanged in a manner which resulted in a mol ratio of the Group II-A metal over the Group I-A metal of about 3.1 while the adsorbents containing the Group I-A metals combination were exchanged in a manner which resulted in a mol ratio of the two Group I-A metals of about 1:1. The adsorbents were tested in accordance with the previously described procedures and the results of the test are reported in Table II below.

TABLE II

| | Selectivity | |
|---|---|---|
| Sieve description | $B_{p-x/M-x}$ | $B_{p-x/EB}$ |
| Group IA-IIA metals: | | |
| Type Y: | | |
| K+Ba exchanged | 3.76 | 2.10 |
| K+Be exchanged | 2.11 | 1.44 |
| K+Mg exchanged | 2.25 | 1.41 |
| Rb+Ba exchanged | 2.05 | 1.41 |
| Cs+Ba exchanged | 1.57 | 1.30 |
| Type X: K+Ba exchanged | 2.49 | 2.03 |
| Group IA metals: | | |
| Type Y: | | |
| K+Rb exchanged | 1.80 | 1.06 |
| K+Cs exchanged | 1.79 | 1.03 | the adsorbent in zones 1 and 2. The desorbent material passes through lines 9 and 14 into zone 3 contacts the adsorbent material located in zone 3 and desorbs extract material from the selective pore volume of the adsorbent. The desorbed extract material passes out of zone 3 via line 13 and out of the process via line 8. The extract stream the fluid flow in zone 3 is therefore from line 9 towards line 8. The adsorbent which passes out of zone 3 at its upstream, line 9, contains essentially pure desorbent material present in both its non-selective void volume and its selective pore volume.

Optional zone 4 in this process can be used to both conserve the amount of desorbent used in the process and prevent the contamination of extract material by raffinate material components. When operational zone 4 is used, it is possible that a portion of the raffinate stream which does not pass out of line 5 can be passed into zone 4 via lines 10 and 11 to displace desorbent material from the non-selective void volume of the adsorbent particles in zone 4 while simultaneously pushing desorbent material out of optional zone 4 via line 14 into zone 3. Since the desorbent material passes into the process via line 9 is connected to conduit 14 which connects optional zone 4 with desorption zone 3, the desorbent material which is displaced from the adsorbent in optional zone 4 tends to reduce the requirements of desorbent material which has to pass through line 9 into the process.

In instances in which optional zone 4 is not utilized it is possible to pass some of the raffinate stream from zone 1 directly into zone 3. In such instances it is required that the composition of the material which leaves zone 1 via line 11 and which bypasses line 5 contains essentially no raffinate material. The initial raffinate material withdrawn from zone 1 contains a very high concentration of desorbent material and can be passed from lines 10 and 11 into zone 3 and in many cases causing a complete stoppage of flow of material out of the process via line 5. When the stream passing through lines 10 and 11 into zone 3 contains an appreciable quantity of raffinate material the flow is stopped and the raffinate stream is then withdrawn via line 5. While the raffinate materials are being withdrawn through line 5, an outside source of desorbent material can be passed into zone 3 via lines 9 or 10.

The material initially taken out via line 8 is essentially a high purity if not totally pure extract material stream. In order to allow contacting of adsorbent in purification zone 2 with a high concentration of purification material (extract material) with the subsequent reduction in the concentration of desorbent material surrounding the adsorbent in zone 2, the first extract material withdrawn from the process can be partially or totally diverted from line 8 into zone 2 via line 13 to effectively allow pure extract material to flush the adsorbent located in zone 2. After a period of time there is an appreciable quantity of desorbent material is present in the extract material withdrawn from zone 3 via line 13. This material can then be withdrawn from the process via line 8. Thereafter, line 13 which connects line 8 to zone 2 can be blocked off and an external purification stream comprising essentially 100% extract material can pass into zone 2 via line 7. It is possible that during the instances in which the extract stream is withdrawn via line 8 that this material can pass into a fractionation facility for separation into desorbent and extract material with a portion of the extract material recycled via line 7 back to zone 2 to effect the purification operation. Any of the aforementioned operations can take place with respect to the purification stream, that is, it can initially pass into zone 2 via line 13 with the extract stream passing out of line 8 essentially stopped, or when an appreciable concentration of desorbent is present in the material being withdrawn from zone 3 an external recycle purification stream can pass into zone 2, or both.

The overall effects of the recycle stream are twofold—namely, first is the reduction of the adverse influence that desorbent plays upon the selectivity of the adsorbent for extract material especially in instances in which there are relatively small quantities of extract material present in the non-selective void volume of the adsorbent particles and it is desired, for hgh efficiency extraction, to essentially adsorb the last trace portions of extract material; second, the passage of a purification stream into zone 2 allows the displacement from the downstream portion of this zone of a raffinate material which is present in the non-selective void volume of the adsorbent and is displaced into zone 1 via line 12.

A cyclic advancement of the input and output streams through the fixed bed of adsorbent can be accomplished by utilizing a manifold system in which the valves in the manifold are operated in a sequential manner to effect the shifting of the input and output streams in the same direction as the overall fluid flow throughout the adsorbent bed, to allow a flow of fluid with respect to solid adsorbent in a countercurrent manner. Another mode of operation which can effect the countercurrent flow of solid adsorbent with respect to fluid involves the use of a rotating disc valve in which the input and output streams are connected to the valve and the lines through which feed, extract, desorbent, purification and raffinate streams pass are advanced in the same direction through the adsorbent bed. Both the manifold arrangement and disc valve are known in the art. Specifically rotary disc valves which can be utilized in this operation can be found in U.S. Pats. 3,040,777 and 3,422,848. Both of the aforementioned patents disclose a rotary type connection valve in which the suitable advancement of the various input and output streams from fixed sources can be achieved without difficulty.

Adsorbent which is located within one of the defined zones is shifted during various periods of the entire cycle of operations in order to allow the adsorbent to remove extract material from a feed stock in an adsorption zone and have that material recovered in desorption zone. The input and output streams as defined are shifted the same direction as the overall fluid flow within the process—that is, in an upward direction according to the drawing.

It is desired in many instances to have located within a zone one or more input or output streams which remain dormant during the operations taking place in that zone. There may be one or more lines connected to the adsorbent in the same manner as one of the operating input or output streams so that when a period of operations is completed and the input and output streams are shifted they move to the next dormant line in a downstream direction. It can then be seen that by shifting the input and output streams in a proper timed sequence that a constant production of raffinate and extract materials can be obtained along with the constant use of feed and desorbent streams and the purification recycle stream.

The adsorbent which is in a given zone during a particular period of operations has previously been located in a zone immediately downstream with respect to fluid flow from the zone in which the adsorbent is now present. It is necessary that in shifting adsorbent from one zone to another that proper techniques be utilized to allow fluid carried into the new zone by the solid entering that zone to be, in some instances, purged from the adsorbent to prevent contamination of fluid in the new zone by fluid withdrawn from the other zone.

EXAMPLE III

In this example comparisons were made between fixed bed countercurrent processes in which a purification stream was passed into the process in the purification zone and a process flow scheme in which the purification stream was not used. The results of the experimental data showed that an increased extract material purity could be achieved

DESCRIPTION OF THE DRAWING

The attached drawing shows one specific manner of operating the process of this invention. In the attached drawing there are four separate operating zones including an optional fourth zone. Since the process of this invention consists of a fixed bed countercurrent fluid-solid contacting process, the attached drawing can be considered to be a fixed bed or series of beds of adsorbent having various input and output streams connected to the conduits connecting the individual beds. The overall flow of fluid through the process as shown in the drawing in an upward direction with the adsorbent remaining stationary. In order to induce a countercurrent flow of fluid with respect to the solid adsorbent, it is necessary that the individual input and output streams be shifted in a single direction after each period of operations of the total cycle of operations has taken place.

As shown in the drawing, the adsorbent is divided into four zones labeled 1, 2, 3, and 4, respectively. In some instances each of the above zones would contain the same general quantity of adsorbent and have the same general physical dimensions. In other instances some zones may require more adsorbent than other zones. As previously mentioned in the specification, there are three basic zones which are required to effect a separation. These zones are an adsorption zone, a purification zone and a desorption zone. In some instances an optional fourth zone is used to prevent contamination of the extract material with raffinate material from zone 1. Terminal zones 1 and 4 are connected by connecting conduits 10 and 11. The connecting conduits allows fluid flowing out of zone 1 via line 11 to eventually flow into zone 4 or zone 3 depending whether or not the optional zone is utilized, thereby allowing a closed loop circulation of fluid. The overall net fluid flow through the four zones for the most part is in an upward direction but in some instances a zone may be operating in a manner as to allow flow of fluid for a certain period of time in a direction opposite to the overall net flow of fluid. In order to continuously produce extract and raffinate streams, the input and output streams 5, 6, 7, 8 and 9 are shifted in the same direction as the net fluid flow in the process after each period of the cycle of operations. In most instances the shifting of input and output streams along the fixed bed of adsorbent is done simultaneously and in the same distance along the bed of adsorbent. In other instances, it is desired that two or more zonal functions take place in the adsorbent between two input and output streams before the input and output streams are shifted.

In the attached drawing zone 1 is an adsorption zone and it is defined as the quantity adsorbent located between the feed input stream 6 and the raffinate outlet stream 5 which is connected to zone 1 via line 11. The purification zone, zone 2, is defined as the adsorbent located between the extract stream 8 and feed stream 6. The desorption zone, zone 3, is defined as the adsorbent which is located between the desorbent inlet stream 9 and extract stream 8. The optional zone 4 is located between the raffinate stream 5 and the desorbent stream 9.

Pumps and valves which are located on the input and output lines and the lines which connect the various zones and which allow flow into and out of the process are not shown. It is presumed they could be located where necessary to one skilled in the art to induce proper fluid flow in the process to effect a reasonable separation of feed into raffinate and extract materials. A pump may be located on one or more of the conduits which connect the various zones in order to induce flow in an overall singular direction. The input streams passing into the various zones can be connected to high pressure sources or pumping means in order to induce flow into the process and the streams which pass out of the process can be regulated by back pressure valves in order to maintain regulated pressure drops through the zones to induce fluid flow. In some instances unidirectional flow directing devices such as check valves can be located on the conduits between the various zones where a pump around circuit is not utilized.

The operations taking place in various zones shown in the attached drawing are as follows:

Zone 1 which is the adsorption zone which, by definition, is located between the feed input line 6 and the raffinate stream outlet line 5. A feed stream passes into the process via line 6, and since the overall general direction of flow within that zone is in upward direction, the feed stock passes through line 12 along with any material which may pass out of zone 2 via line 12 into zone 1. Extract material and some raffinate material is adsorbed within the selective pore volume of the adsorbent in zone 1. The material which is adsorbed by the selective pore volume of the adsorbent in zone 1, in most instances, is required to desorb desorbent material which is present within the selective pore volume of adsorbent from the adsorbent's previous contact with desorbent material in zone 3. It is possible to have desorbent material completely removed from the adsorbent before it contacts the feed stock in the adsorption zone by allowing essentially pure raffinate material from zone 1 to contact adsorbent in zone 4 to displace desorbent material from the adsorbent and into zone 3 via line 14.

As feed is passed into zone 1 an equal volume of raffinate stream material is displaced from zone 1 leaving that zone via line 11. A portion or all of the raffinate stream which passes through line 11 may be recovered via line 5 with any portion not recovered passed through line 10 into either zone 3 or zone 4 depending upon whether optional zone 4 is used in the process.

Zone 2 is defined as the adsorbent material located between the extract stream outlet line 8 downstream to the feed input stream line 6. It is noted that the purification zone also has passing into it line 7 which is the recycle purification stream. Line 7 may be placed anywhere along the adsorbent material located in zone 2 from its most upstream location at line 8 to any location upstream from line 6. It is preferred that line 7 be located so that there is some adsorbent located between it and line 6.

The essential operation taking place in the purification zone, zone 2, is the removal of raffinate material from adsorbent which from a previous cycle of operations in zone 1 has been located in the adsorption zone 1. When the adsorbent passes into the purification zone from the adsorption zone it generally contains some raffinate material present in the adsorbent's selective pore volume and non-selective void volume. The raffinate material is removed from the adsorbent by contacting the adsorbent with a countercurrent flow of purification stream material (extract material). In normal operations the adsorbent would contact a mixture of desorbent and extract material, the extract stream, which would effect the removal of raffinate material from the adsorbent. A portion of the extract stream would pass into the purification zone from zone 3, the desorption zone, via line 13. The purification stream in the present invention allows removal of raffinate material from the adsorbent in the purification zone while substantially reducing or totally eliminating the quantity of desorbent which passes into the purification zone. As mentioned previously, the elimination or substantial reduction of desorbent material in the purification zone enhances the adsorbent's ability to adsorb extract material from the fluid surrounding the adsorbent in the purification zone.

It is possible to regulate the fluid flow through zone 2 by monitoring the quantity of purification material passing into this zone via line 7, the material passing into this zone from zone 3 via line 13, and the amount of material passing out of the uppermost portion of the zone 1 via line 12.

Zone 3 which is located immediately upstream from zone 2 with respect to the fluid flow in zone 2 allows recovery of extract material which has been adsorbed by when the purification stream was passed into the process as a recycle stream as compared to extract purity when there was no purification stream used.

The apparatus used in these experiments consisted of a column containing 24 individual beds of adsorbent which were serially connected by flow conduits. The flow conduits contained transfer taps which allowed material to either pass into the process or pass out of the process via the taps on the connecting conduits in accordance with a predetermined cycle of operations. In some of the transfer taps which were connected to the flow conduits connecting the beds there was no fluid flow.

The entire apparatus contained approximately 11.3 gals. of a crystalline aluminosilicate adsorbent. The sieves were found to contain approximately 1.64 gals. of selective pore volume and approximately 6.71 gals. of non-selective void volume.

All experiments were conducted at approximately 350° F. and a pressure of approximately 200 p.s.i.g. The feed stock consisted of a xylene mixture containing approximately 14.4 wt. percent para-xylene, 35.1 wt. percent meta-xylene, 18.1 wt. percent ortho-xylene, 31.9 wt. percent ethylbenzene, 0.4 wt. percent isopropyl benzene, and 0.1 wt. percent butylbenzene.

The adsorbent used in all the experiments was essentially a 13 X type zeolite which had been ion-exchanged with both barium and potassium. The adsorbent, prior to its use in the experiments was dried at an elevated temperature to reduce the water content of the zeolite to a few wt. percent of the adsorbent. The desorbent used in the experiments was essentially a mixture of diethylbenzenes isomers consisting of 60.4 vol. percent meta-diethylbenzene, 7.4 vol. percent ortho-diethylbenzene, 25.6 vol. percent para-diethylbenzene and 6.6 vol. percent butyl-benzenes. The purpose of these experiments was only to determine the advantages obtained through the use of purification recycle stream and not to determine optimum operating parameters with respect to temperatures, pressures, adsorbent, or types of desorbents utilized.

The apparatus used contained four separate operating zones although the process can be operated utilizing three distinct operating zones. It was not desired to utilize a three zone system since that would require extensive modification to the available apparatus.

A particular description of the apparatus employed in these examples is as follows. Proceeding in a downstream direction from the raffinate outlet stream, line 5, into zone 4 there were four beds with no input or output streams being used in these beds except for the downstream boundary of zone 4 which was line 9, the desorbent inlet stream. Proceeding from this stream in a downstream direction through zone 3, there were six adsorbent beds with no input or output streams connected to any of these beds except for line 8, the extract stream, which defined the downstream boundary of zone 3. Proceeding in a downstream direction from line 8 there were a total of 8 adsorbent beds, one adsorbent bed downstream from the extract stream, line 8, was a purification inlet stream, line 7, downstream from line 7 there were six adsorbent beds with a flush stream inlet passed into zone 2 in the downstream boundary of the sixth bed. The remaining bed was located downstream from the flush inlet stream and immediately upstream from the downstream boundary of zone 2. The purpose of the flush stream was to remove feed components from the line through which feed has passed after the feed stream had been shifted to its new location in a downstream direction. This prevented the extract stream from being contaminated with raffinate during subsequent purification operations when this line carried purification material.

Zones 1 and 4 were at opposite ends of the 24 adsorbent bed apparatus and were connected by a conduit 10 which contained a pump to induce flow of material through this line in the same direction as the feed flow in zone 1. Conduit 10 and the pump comprise a pump around circuit which in these experiments was necessary in order to induce overall fluid flow in the process. It is not required that a pump around circuit be utilized to induce overall fluid flow in the process. By metering proper pressure drop across the various input and output streams connected to the 24 adsorbent beds and placing flow directing devices such as check valves in the conduits connecting the individual adsorbent beds, the same type fluid flow would be induced.

In the operations in which no purifications stream was used, line 7, was omitted from the process flow and the remaining input and output streams were placed identically as that described above.

In order to the continuous simulated moving bed flow to take place, it is necessary that after a period of flow within the process that all the input and output streams be transferred at least one adsorbent bed along a downstream direction at about the same time. The shifting of the input and output streams one or more beds in a downstream direction comprises a single period of the entire cycle of operations. The entire cycle of operations takes place when enough individual period of operations had taken place to place the input and output streams in the identical position that they were in when the cycle of operations was begun.

In all the experiments conducted in this example the total cycle of operations through the 24 adsorbent beds and back to the original position of the input and output streams was ½ hour, this amounted to about 1.25 minutes of flow for each individual period of operations of the 24 period of operations making up the entire cycle of operations.

In controlling the operating conditions for the various experiments, an important factor which was considered was the reflux ratio occurring within the various zones of operation. The reflux ratio within the given zone is defined as the net liquid flow into the zone in question minus the non-selective void volume of the adsorbent which passes into that zone, the above quantity all over the selective pore volume of adsorbent passing into the zone. The reflux ratio is presented in Equation 5 below.

$$\text{Reflux ratio} = \frac{\text{Liquid flow into zone} - \text{Non-selective void volume of adsorbent passing into zone}}{\text{Selective pore volume of adsorbent passing into zone}} \quad (5)$$

Therefore, it can be seen that in instances where the reflux ratio is 0 the liquid flow into a zone is exactly equal to the non-selective void volume of the adsorbent passing into that zone. In instances in which the reflux ratio is a positive number, the net liquid flow into the zone in question exceeds the volume of the non-selective voids of the adsorbent entering that zone which allows the liquid flowing into the zone to purge any liquid entrained by the adsorbent's nonselective void volume passing into that zone. In instances in which the overall reflux ratio is a negative number, the volume of liquid present in the non-selective void volume of the adsorbent which passes into the zone in question exceeds the liquid flow rate into that zone. This means the liquid trapped by the adsorbent in the non-selective voids is not totally removed from the adsorbent prior to its passing into the zone.

In most instances the reflux ratio of the zones in the experiments were positive so that there was enough liquid flowing into each zone from an input stream or from material bypassing an output stream from a zone immediately upstream from the zone in question, to effectively purge the adsorbent.

Three examples were conducted to show the improved effects of using the purification stream. The results of three experiments along with the basic operating conditions necessary to reproduce them are shown in Table III below.

TABLE III

| Experiment | 1 | 2 | 3 |
|---|---|---|---|
| Reflux ratios: | | | |
| Zone 2 | 1.2 | 1.2 | 0.85 |
| Zone 3 | 2.4 | 2.4 | 2.0 |
| Zone 4 | −0.1 | −0.1 | −0.1 |
| Flow rates, g.p.h. at 60° F.: | | | |
| Feed stream | 2.74 | 2.74 | 2.74 |
| Desorbent stream | 8.52 | 8.52 | 7.22 |
| Purification stream | 0 | 0.25 | 0.45 |
| Extract material purity, wt. percent | 96.7 | 99.2 | 99.6 |
| Efficiency of extraction,[1] percent | 84.4 | 84.8 | 85.0 |

[1] Defined as the ratio of extract material in the extract stream over the quantity of extract material in both the raffinate and extract streams.

As can be seen from the above data, Experiments 2 and 3, in which the purification stream was used, increased the purity of the extract material from about 96.7% up to about 99.2–99.6% purity. The three experiments were all operated at the same basic operating conditions holding the efficiency of extraction at about 84 to 85%. This efficiency is high enough to be used in commercial operations but is anticipated that through other processing changes the efficiency may be increased up to about 90% and in some instances approaching 100% efficiency.

It should be noted in Experiment 3 that the desorbent flow rate was smaller than that used in Experiments 1 and 2 and the reflux ratio of both zones 2 and 3 were also reduced. The reduced quantity of desorbent used for Experiment 3 resulted in a net reduction of liquid flow into zone 3 thereby reducing its reflux ratio, and the reduction in material bypassing extract stream 8 from zone 3 into zone 2 which also resulted in a slight reduction of the reflux ratio in zone 2. The improved results for experiment 3 are due to the increase in the purification stream quantity recycled to zone 2 and not due to the zonal reflux ratio changes.

It should be recognized that while the maximum increase in extract purity when comparing the experiments is about 2.9 actual percent this is a significant increase in the extract purity since at these extraction purity levels there is an extremely small quantity of extract material present in the fluid surrounding the adsorbent material. In order to adsorb extract material present a large increase in the amount of adsorbent located in zones 1 and 2 is needed to totally remove the last portions of the extract from the fluid surrounding the adsorbent. It can be seen that in Experiments 2 and 3 that by passing a portion of pure extract material through the process it is relatively easy to increase the extract product purity by merely increasing the quantity of purification material passed to the purification zone.

It is anticipated that the same general results will occur in the separation involving other desorbents or adsorbents.

EMBODIMENT

In a broad embodiment this process relates to an aromatic separation process in which at least three distinct zones effect adsorption, purification and desorption of an extract material from a feed stock wherein a purification stream which comprises extract material is passed to a process in order to allow recovery of substantially all the extract material from the feed.

We claim as our invention:

1. A process for the separation of an aromatic feed stream into an extract material and a raffinate material through the use of a selected adsorbent having selective adsorptive properties for said extract as compared to said raffinate, said process comprises:

(i) introducing said feed through a feed line into a first zone of a column of solid adsorbent containing at least three serially interconnected zones having fluid flow connecting means between adjacent zones and between the outlet of one terminal zone and the inlet of the other terminal zone in the series to provide cyclic fluid flow in said process, at adsorption conditions to effect the selective adsorption of said extract material along with secondary adsorption of raffinate materials, said first zone being defined as the adsorbent located between the feed stream introduction and a raffinate stream withdrawal and having the feed stream introduction location of said zone as the sole hydrocarbon introduction location of said zone, said adsorbent in said zone containing adsorbed desorbent from a previous contact with desorbent in a third zone defined below;

(ii) withdrawing a raffinate stream from said first zone from a location downstream from said feed introduction location into said first zone with respect to the feed flow in said first zone;

(iii) recovering raffinate material from at least a portion of said raffinate stream;

(iv) introducing a desorbent material into a third zone of the column of adsorbent at desorption conditions to effect the desorption of extract material from said adsorbent, said third zone being located upstream from said first zone with respect to feed fluid flow in said first zone;

(v) withdrawing a stream containing extract material from said third zone from a downstream location from said desorbent introduction location into said third zone with respect to the fluid flow in said third zone;

(vi) recovering at least a portion of extract material withdrawn from said third zone;

(vii) passing at least a portion of extract material as a purification stream and a flush stream into a second zone of said column of adsorbent, said purification stream positioned upstream from said flush stream with respect to fluid flow in said second zone, said flush stream effecting the flushing of feed components from the line previously carrying feed and said purification stream effecting the desorption of raffinate and desorbent material from said adsorbent and from the interstitial void spaces between adsorbent particles, said second zone being located upstream of said first zone with respect to fluid flow in the first zone and downstream of said third zone with respect to fluid flow in said third zone and having a net flow of fluid flowing therethrough in a similar direction as the net fluid flow in the first and third zones;

(viii) periodically advancing in a downstream direction with respect to fluid flow in the first zone through said adsorbent, the points of feed introduction, raffinate stream withdrawal, desorbent introduction, extract withdrawal, purification stream introduction and flush stream introduction to effect the shifting of said zones through said adsorbent and the production of extract and raffinate material from said feed.

2. Claim 1 further characterized in that said feed stream comprises hydrocarbons selected from the group consisting of $C_8$ and $C_{10}$ aromatics.

3. Claim 2 further characterized in that said feed stream comprises xylenes and that para-xylene comprises said extract material.

4. Claim 1 further characterized in that said desorbent material is a hydrocarbon having a different number of carbon atoms per molecule as compared to the extract material and is selected from the group consisting of benzene, toluene, xylene, ethylbenzene and diethylbenzene.

5. Claim 1 further characterized in that said adsorbent is selected from the group consisting of the type X and type Y structured crystalline aluminosilicates.

6. A process for the separation of a feed stream comprising $C_8$ aromatics including para-xylene, at least one other xylene isomer and ethylbenzene into a selectively adsorbed extract material comprising para-xylene and a raffinate material comprising less selectively adsorbed feed components, said process comprises:

(i) introducing said feed through a feedline into a first zone of a mass of a crystalline aluminosilicate adsorbent containing at least three serially connected zones having fluid flow connecting means between adjacent zones and between the outlet of one terminal zone and the inlet of the other terminal zone in the series to provide cyclic fluid flow in said process, at adsorption conditions to effect the selective adsorption of said para-xylene along with the secondary adsorption of raffinate material, said first zone being defined as the adsorbent located between the feed stream introduction location and the raffinate stream withdrawal location of said zone, said adsorbent in said zone containing adsorbed desorbent from a previous contact with desorbent in a third zone defined below;

(ii) withdrawing a raffinate stream from said first zone from a location downstream from said feed introduction location into said first zone with respect to the feed flowing through said first zone;

(iii) recovering raffinate material from at least a portion of said raffinate stream;

(iv) introducing a desorbent material into a third zone of the mass of adsorbent at desorption conditions to effect the desorption of para-xylene extract material from said adsorbent, said third zone being located upstream from said first zone with respect to feed flow in said first zone;

(v) withdrawing an extract stream containing para-xylene from said third zone from a location downstream from said desorbent introduction location into said third zone with respect to the desorbent material flow in said third zone;

(vi) recovering at least a portion of the para-xylene present in said extract stream;

(vii) passing at least a portion of extract material as a purification stream and a flush stream into a second zone of said column of adsorbent, said purification stream positioned upstream from said flush stream with respect to fluid flow in said second zone, said flush stream effecting the flushing of feed components from the line previously carrying feed and said purification stream effecting the desorption of raffinate and desorbent material from said adsorbent and from interstitial void spaces between adsorbent particles, said second zone being located immediately upstream of said first zone with respect to fluid flow in the first zone and immediately downstream of said third zone with respect to fluid flow in the third zone and having a net flow of fluid therethrough in a similar direction as the fluid flow in said first and second zones;

(viii) periodically advancing in a downstream direction with respect to fluid flow in the first zone through said mass of adsorbent the points of feed introduction, raffinate stream withdrawal, desorbent introduction, extract stream withdrawal, purification stream introduction and flush stream introduction to effect the shifting of said zones through said mass of adsorbent and the production of extract and raffinate material from said feed.

7. Claim 1 further characterized in that said purification stream consists essentially of extract material.

8. Claim 6 further characterized in that said purification stream consists essentially of extract material.

References Cited

UNITED STATES PATENTS

| | | | |
|---|---|---|---|
| 3,201,491 | 8/1965 | Stine et al. | 260—674 |
| 3,558,732 | 1/1971 | Neuzil | 260—674 |
| 3,558,730 | 1/1971 | Neuzil | 260—674 |
| 2,646,451 | 7/1953 | Rommel | 260—674 |
| 3,274,099 | 9/1966 | Broughton | 208—310 |

DELBERT E. GANTZ, Primary Examiner

C. E. SPRESSER, JR., Assistant Examiner

U.S. Cl. X.R.

208—310